United States Patent [19]

Anthony et al.

[11] 3,960,208

[45] June 1, 1976

[54] PROCESS FOR PROVIDING HEAT TRANSFER WITH RESISTANCE TO EROSION-CORROSION IN AQUEOUS ENVIRONMENT

[75] Inventors: William H. Anthony; James M. Popplewell, both of Guilford, Conn.

[73] Assignee: Swiss Aluminium Ltd., Chippis, Switzerland

[22] Filed: Dec. 13, 1974

[21] Appl. No.: 532,335

Related U.S. Application Data

[62] Division of Ser. No. 439,335, Feb. 4, 1974, Pat. No. 3,872,921, which is a division of Ser. No. 222,795, Feb. 2, 1972, Pat. No. 3,809,155.

[52] U.S. Cl. .............................. 165/1; 29/157.3 R; 165/133; 165/134; 165/180
[51] Int. Cl.² .................... F28F 19/06; F28F 21/08
[58] Field of Search .................. 29/157.3 R, 197.5; 165/1, 133, 134, 180

[56] References Cited
UNITED STATES PATENTS 3,053,511   9/1962   Godfrey ........................ 165/180 X
3,530,932   9/1970   Pryor ............................. 165/180 X
3,650,005   3/1972   Kamiya et al. ................. 165/180 X

*Primary Examiner*—Albert W. Davis, Jr.
*Assistant Examiner*—Sheldon Richter
*Attorney, Agent, or Firm*—Robert H. Bachman

[57] ABSTRACT

A composite aluminum article having increased resistance to erosion corrosion in aqueous environments comprising an aluminum base alloy cladding consisting essentially of 0.8 to 1.3% zinc, 0.7% maximum silicon plus iron, 0.10% maximum copper, 0.10% maximum manganese, 0.10% maximum magnesium, balance essentially aluminum, bonded to at least one side of an aluminum base alloy core consisting essentially of manganese from 1.0 to 1.5%, chromium from 0.1 to 0.4%, copper from 0.05 to 0.4%, balance essentially aluminum.

8 Claims, 2 Drawing Figures

U.S. Patent   June 1, 1976   3,960,208

PROCESS FOR PROVIDING HEAT TRANSFER WITH RESISTANCE TO EROSION-CORROSION IN AQUEOUS ENVIRONMENT

CROSS REFERENCE TO RELATED APPLICATIONS

This application is a division of copending application Ser. No. 439,335, filed Feb. 4, 1974, now U.S. Pat. No. 3,872,921, which in turn is a division of application Ser. No. 222,795, filed Feb. 2, 1972, now U.S. Pat. No. 3,809,155.

BACKGROUND OF THE INVENTION

It is highly desirable to develop composite aluminum articles having improved resistance to erosion corrosion in aqueous environments due to the wide use of aluminum commercially in aqueous environments.

For example, aluminum tubing which is used in heat exchangers such as aluminum radiators should have high resistance to erosion corrosion damage by the aqueous heat exchange fluid.

Aluminum automobile radiators have been extensively tested. Unfortunately, however, materials which are suitable are often subject to erosion corrosion damage and, hence, have a limited life expectancy due to the development of leaks in service. The leaks may be developed due to the erosion corrosion channeling excavating the tube wall as the coolant stream passes around blockages in the tubes. Very high stream velocities which could occur in such channels can readily result in erosion corrosion damage unless the material is highly resistant to this type of damage.

Accordingly, it is an object of the present invention to provide composite aluminum articles having improved resistance to erosion corrosion in aqueous environments.

It is a further object of the present invention to provide composite aluminum tubing having improved resistance to erosion corrosion in aqueous environments.

It is a still further object of the present invention to provide an improved heat exchange assembly utilizing said tubing, a process for improving heat transfer with resistance to erosion corrosion in an aqueous environment and an improved heat transfer system.

Further objects and advantages of the present invention will appear from the ensuing specification.

SUMMARY OF THE INVENTION

In accordance with the present invention it has now been found that the foregoing objects and advantages may be readily achieved.

Composite aluminum articles of the present invention have substantially improved resistance to erosion corrosion in an aqueous environment. The composite comprises an aluminum alloy cladding consisting essentially of 0.8 to 1.3% zinc and 0.7% maximum silicon plus iron, 0.10% maximum copper, 0.10% maximum manganese, 0.10% maximum magnesium, balance essentially aluminum bonded to at least one side of an aluminum base alloy core consisting essentially of manganese from 1.0 to 1.5%, chromium from 0.1 to 0.4%, copper from 0.05 to 0.4%, and the balance essentially aluminum.

The present invention also contemplates a composite aluminum tubing and a high strength heat exchange assembly having improved resistance to erosion corrosion in an aqueous environment. The assembly comprises at least one header connected by at least one tube and a secondary heat exchange surface connected to said tube. The tube is the improved composite aluminum tubing of the present invention. The preferred embodiment includes two parallel headers connected by a plurality of said tubes perpendicular therewith, with corrugated fin stock material being bonded to said tubes.

The present invention also contemplates an improved heat transfer system and a process for providing heat transfer with resistance to erosion corrosion in an aqueous environment. The process comprises providing the metal tubing of the present invention having entrance and exits ends, affixing said entrance and exit ends to two tube sheets, passing a first aqueous liquid through said tubing and contacting the external surface of the tubing with a second fluid in heat exchange relationship with the first fluid.

BRIEF DESCRIPTION OF THE DRAWINGS

FIG. I is a perspective view of the tubing of the present invention.

FIG. II is a front view, with portions cut away, of an automobile radiator including the tubing of the present invention.

DETAILED DESCRIPTION

Figure 1:
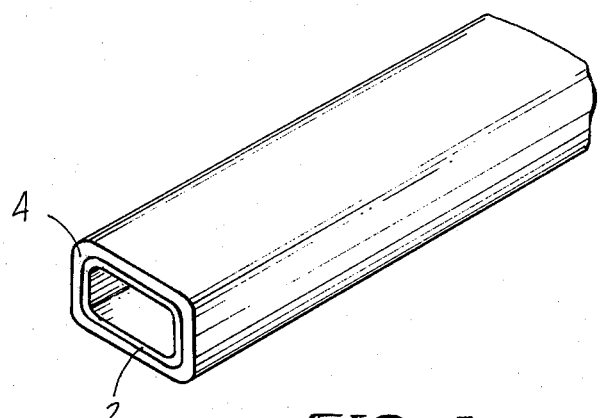
Figure 2:
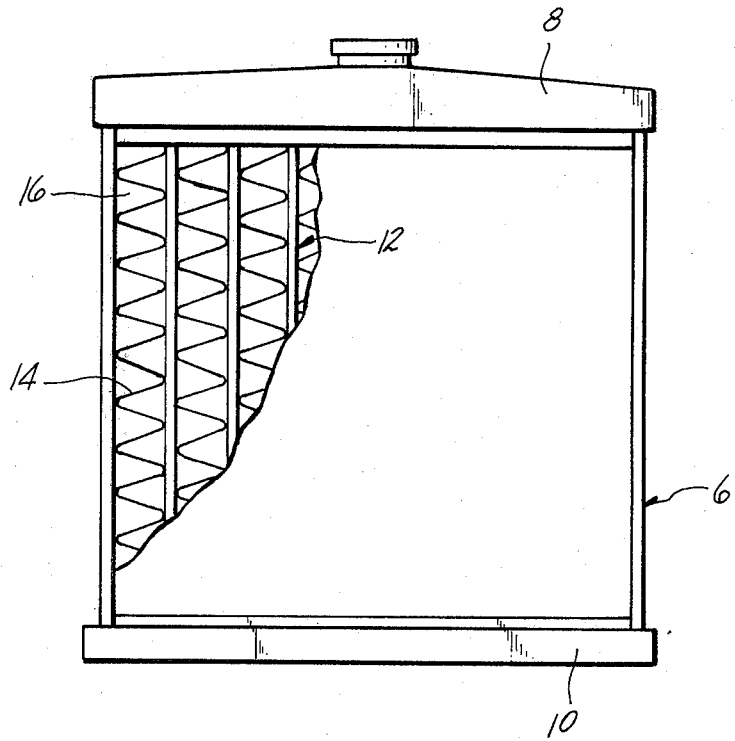

The composite aluminum articles of the present invention comprises an aluminum alloy cladding consisting essentially of 0.8 to 1.3% zinc and 0.7% maximum silicon plus iron, 0.10% maximum copper, 0.10% maximum manganese, 0.10% maximum magnesium, balance essentially aluminum bonded to at least one side of an aluminum base alloy core consisting essentially of manganese from 1.0 to 1.5%, chromium from 0.1 to 0.4%, copper from 0.05 to 0.4%, and the balance essentially aluminum.

As indicated hereinabove, the present invention is characterized by surprising resistance to erosion corrosion in an aqueous environment wherein the aluminum alloy cladding is exposed to the aqueous environment. It has also been found that this improved resistance can be accomplished with retention of excellent physical properties.

In addition to the foregoing, the composite of the present invention has improved resistance to pitting corrosion.

The excellent erosion corrosion resistance of the composite of the present invention is highly desirable commercially. This property admirably lends the tubing of the present invention to use in heat exchange assembly such as in an aluminum radiator and the tubing of the present invention would result in a substantially longer useful life. The surprising properties achieved in accordance with the present invention would give the material of the present invention good utility in other applications using high speed fluids.

It has been found that in aqueous environments wherein erosion corrosion or impingement attack occurs, as for example, upon the inside wall or cladding 2, as shown in FIG. I of the tubing carrying the aqueous solution, that the aluminum composite of the present invention has surprising resistance to this destructive attack. This resistance is obtained since, should perforation of the aluminum alloy cladding 2, as shown in FIG. I, occur, further localized corrosion is retarded or eliminated by the cathodic protection afforded to the exposed alloy core 4. More specifically the cladding material is anodic to the core material in an aqueous environment such as an antifreeze solution in automotive radiators and should localized perforation of the cladding occur, as in impingement attack, the current generated by the relatively large anode and small cathode is such as to effectively inhibit penetration of the core and hence the core is cathodically protected from further attack.

The cladding material of the present invention may also contain impurities such as up to 0.7% silicon plus iron, up to 0.1% copper, up to 0.1% manganese, up to 0.1% magnesium, others 0.05% each, total 0.15%.

The core material of the present invention may also contain impurities such as up to 0.6% silicon, up to 0.7% iron, up to 0.1% zinc and others 0.05% each, total 0.15%.

Naturally the cladding may be bonded to the outside surface of the core should the aqueous media flow around the tubes rather than through them or the core may advantageously be clad on both sides wherein a first aqueous medium passes through the tubing and a second aqueous medium passes around the tubing.

The tubing of the present invention normally, but not necessarily has a wall thickness no larger than 0.10 inch. When the tubing of the present invention is used in a high strength aluminum radiator, the tubing has a wall thickness 0.030 inch or smaller and preferably has a wall thickness from 0.010 inch to 0.020 inch. For heat exchange applications in general, the tubing of the present invention most advantageously has a wall thickness of 0.1 inch and smaller.

The percentage thickness of the cladding of the tubing of the present invention is not critical but generally ranges from 5 to 25% of the total composite wall thickness of the composite in order to insure a sufficient thickness of the core material for strength as well as sufficient thickness of the cladding in order to provide for a sufficiently long cladding life in service.

The tubing of the present invention may be readily prepared by conventional methods. For example, aluminum ingots may be conventionally prepared and rolled to strip in a conventional manner and then strips of the clad and core material rolled together. The material may then be welded or extruded into tubing having the desired configuration. The tubing may also be formed by drawing of the core in tubular form over the cladding material in tubular form if desired.

If desired fins of an alloy such as the AA 4XXX series or of the core material may be provided on an exposed surface of the core material and bonded thereto by, for example a brazing filler metal or by providing an additional cladding bonded to the core which is suitable for bonding to the fin material, such as an AA 4XXX series alloy.

Radiator tubing is generally seam welded into substantially round tubing and flattened into an oval or flat cross section. Thus, bonding together of the clad and core material may be readily achieved by rolling of the composites together before welding. The smaller dimension is preferably from 0.05 to 0.2 inch. The larger dimension is preferably from 0.3 to 1.2 inches. For heat exchange applications in general, the tubing of the present invention may be advantageously used having an outside diameter (O.D.) up to several inches and preferably from ¼ inch O.D. to 2 inches O.D.

The aluminum radiator may be prepared in a conventional manner utilizing brazing in a continuous aluminum radiator manufacturing line. As a specific example, an aluminum radiator may be prepared from tubing of the present invention having a 17 mil thick wall and fin stock which may be either the same alloy as the core material or a conventional aluminum alloy of the 4XXX series for example, aluminum alloy 4043, 4343 or 4045. An assembly is prepared having the configuration of the desired aluminum radiator. The fixtured assembly is dip coated with a salt flux and then furnace brazed in a continuous manner on a production line. The radiators pass through an air furnace where the brazing filler metal melts and then solidifies resulting in the formation of a rigid assembly. Alternatively, fluxless brazing procedures may be used.

As aforementioned an additional cladding of a brazing alloy such as an AA 4XXX series alloy may be bonded to the exposed surface of the core material for bonding to the fin stock, if desired.

Thus, in accordance with the present invention the high strength heat exchange assembly may have the configuration shown in FIG. II, which represents an illustrative heat exchanger embodiment. Referring now to FIG. II, the radiator assembly includes a heat dissipating unit or core 6 having at opposite ends a top tank or inlet header 8 and a bottom tank or outlet header 10, adapted for connection, respectively, with the discharge and intake conduits or a cylinder block cooling jacket for the flow of cooling aqueous medium from one tank to the other. The core 6 is made up of a number of fluid passageways of water tubes 12 of the present invention. The tubes are spaced apart by fin strips 14. The fins are folded or corrugated between tubes 12 and extend between adjacent walls or adjoining tubes to divide the space into a number of relatively small air cells 16.

The present invention will be more readily apparent from a consideration of the following illustrative examples.

EXAMPLE I

Three alloys, Alloys A, B and C, were Durville cast and then homogenized at 1125°F for about 8 hours and air cooled. The composition of the resulting alloys is shown in Table I below:

TABLE I

| Ingot | Si | Fe | Cu | % Composition Mn | Mg | Cr | Zn | Ti |
|---|---|---|---|---|---|---|---|---|
| A | .21 | .41 | .11 | 1.18 | — | — | .11 | .005 |
| B | .19 | .35 | .20 | 1.18 | — | .21 | .11 | .007 |
| C | .03 | .24 | — | — | — | — | 1.03 | .005 |

EXAMPLE II

Ingots A and B of Example I were scalped to 1.5 inches and then wired brushed and vapor degreased. Ingot C was hot rolled at 800°F to 0.25 inch gage using a 0.1 inch pass with reheating to 800°F with each second pass. The hot rolled material was then cold rolled to 0.050 inch gage. The 0.050 inch gage material of ingot C was then welded to each of the A and B ingot slabs on four sides to form A and B composites respectively leaving 1 inch long openings in the weld across one of the shorter edges so that air could be expelled during further rolling of the composites. The composites were then heated to 800°F for five minutes and given skin passes of about a 3% reduction each with the partially opened edge facing in a direction opposite to the travel of the composites. The composites were then reheated to 800°F, hot rolled to 0.25 inch gage, and then cold rolled to 0.050 inch gage.

The cladding thickness of the A and B composites were then measured on mounted and polished sections and found to be 1.5 and 1.6 mils thick respectively.

The composites of Example I were then heated up and cooled down using a pit furnace in such a way to simulate the effect of a brazing step in a continuous aluminum radiator manufacturing line. This was done in order to allow for any possible interdiffusion effects which could result in reducing the electrode potential difference between the components of each composite during the aluminum radiator manufacturing. The heat up and cool down cycle is as follows: The composites were heated to 1150°F and cooled to 800°F within two minutes at a constant cooling rate and then quenched in water at 160°F.

EXAMPLE III

The composites of Example I and II were cut into appropriate size specimens and subjected to impingement by a plurality of jets of an aqueous antifreeze material simulating the effects of long term erosion corrosion in automobile radiators. Uncomposited Alloy A, further rolled to 0.050 inch after processing to 1.5 inches thickness in Example I, and the composite A were employed as controls. The antifreeze material was a commercial, inhibited aqueous ethylene glycol containing a 45% nominal by volume ethylene glycol which was directed onto the samples at a temperature of about 200°F with the velocity of the jets at about 98 feet per second. The test was carried out for six days.

At the end of the test the specimens were removed and rinsed in distilled water followed by solvent rinses in methanol and benzene. The samples were then chemically cleaned by immersing them in an aqueous bath of chromic plus phosphoric acids at 80°C. They were then rinsed in distilled water, dried and the depths of the resultant impingement craters measured. The depth of attack in the control composite comprising the A plus C material or composite A and the uncomposited alloy A material was found to be about three mils whereas the depth of attack in the composite comprising the B and C material or composite B was found to be about 1.8 mils maximum. The exposed core of the B composite or the B alloy was found to be substantially free of attack attesting to the galvanic protection afforded to the B alloy by the C alloy cladding of the composite whereas the exposed core material of the A composite or the A alloy had numerous small pits indicating that the galvanic protection afforded to the alloy by the C alloy cladding is practically nonexistant.

The cladding adjacent to the exposed core of the B composite was found to be substantially consumed thereby indicating cathodic protection was provided to the B alloy core whereas there was substantially less consumption of the cladding in the crater rim of the control A composite.

EXAMPLE IV

The present example illustrates the potential difference between the alloys of the composite of the present invention.

Durville ingots of the following composition were cast and homogenized and processed to 0.050 inch gage as in Example I and then subjected to a simulated brazed condition as in Example II.

TABLE II

| Ingot | Si | Fe | Cu | Mn | Mg | Cr | Zn | Ti |
|---|---|---|---|---|---|---|---|---|
| A | .20 | .41 | .20 | 1.28 | — | — | .094 | .006 |
| B | .20 | .41 | .20 | 1.28 | — | .20 | .095 | .006 |

Specimens were cut from the A and B alloys and from 0.050 inch gage C cladding material of Example I for impingement testing as in Example III. A portion of each specimen was passed through a special composite gasket of silicon rubber in the jet chamber of the jet tester without making electrical contact with the flange or leaking any antifreeze when the gasket was tightened. Special rubber inserts were employed so that the specimens were mounted without incurring any electrical leakage to the stainless steel jet tester chamber. In this manner it was possible to mount dissimilar specimens in jet test chambers and measure the current flow between them while they were subjected to antifreeze jet impingement at any temperature desired.

The current flow was measured by monitoring the potential drop across a two ohm resistor which shunted the electrodes externally. The value of the resistor was less than 0.5% of the total electrolytic resistance path in the antifreeze between the two test specimens. In this manner the current flow between Alloy C of Example I and Alloy A of the present example and Alloy C of Example I and Alloy B of the present example was monitored while the antifreeze impinged on the samples at 98 feet per second. The temperature was cycled up and down from 40°C to 105°C for three successive cycles. The direction of current flow throughout the cycling was such that the alloy C of Example I component remained anodic for both couples.

It was apparent that throughout the several cycles the current output of the Alloy B-Alloy C was about 5 times as great as the Alloy A-Alloy C. Thus a startling and unexpectedly large difference to the protective cathodic current is provided by the Alloy C anode material coupled to Alloy B and this is especially true within the temperature range of 90°C to 105°C where automobiles normally operate. In particular the Alloy A-Alloy C couple provided 16 microamps current in the descending leg of the third cycle at a temperature of 93.3°C (or 200°F) while the Alloy B-Alloy C couple provided 100 microamps at the same point.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for providing heat transfer with resistance to erosion corrosion in an aqueous environment which comprises:
  A. providing metal tubing comprising an aluminum base alloy cladding consisting essentially of 0.8 to 1.3% zinc, 0.7% maximum silicon plus iron, 0.10% maximum copper, 0.10% maximum manganese, 0.10% maximum magnesium, balance essentially aluminum bonded to at least one side of an aluminum base alloy core consisting essentially of manganese from 1.0 to 1.5%, chromium from 0.1 to 0.4%, copper from 0.05 to 0.4%, balance essentially aluminum, said metal tubing having entrance and exits ends having a wall thickness no larger than 0.1 inch;
B. affixing the said entrance and exit ends to two tube sheets;
C. passing a first aqueous liquid through the tubing;
D. contacting the external surface of said tubing with a fluid in heat exchange relationship with said fluid.

2. A process according to claim 1 wherein said cladding is bonded to opposing sides of said core.

3. A process according to claim 1 wherein said cladding contains up to 0.7% silicon plus iron, up to 0.1% copper, up to 0.1% manganese, up to 0.1% magnesium, others 0.05% each, total 0.15%.

4. A process according to claim 1 wherein said core contains up to 0.6% silicon, up to 0.7% iron, up to 0.1% zinc, and others 0.05% each, total 0.15%.

5. A process according to claim 1 wherein said tubing has a wall thickness of from 0.010 to 0.030 inch.

6. A process according to claim 1 including the step of connecting secondary heat exchange surface to said tubing.

7. A process according to claim 6 wherein the secondary heat exchange surface is corrugated fin stock material bonded to said tubing.

8. A process according to claim 7 wherein said tubing is affixed to two parallel headers connected by a plurality of said tubing perpendicular therewith.

* * * * *